United States Patent [19]

Tokuno et al.

[11] Patent Number: 4,580,086

[45] Date of Patent: Apr. 1, 1986

[54] METHOD FOR POSITIONING TOOLS

[75] Inventors: Masateru Tokuno, Hyogo; Tetsuya Sawada, Kyoto; Yasuharu Mori, Hyogo, all of Japan

[73] Assignee: Rengo Co., Ltd., Osaka, Japan

[21] Appl. No.: 589,527

[22] Filed: Mar. 14, 1984

[30] Foreign Application Priority Data

Mar. 15, 1983 [JP] Japan .................................. 58-43632

[51] Int. Cl.⁴ .............................................. G05B 19/28
[52] U.S. Cl. ..................................... 318/603; 318/625; 83/499
[58] Field of Search .......................... 318/603, 39, 625; 83/479, 498, 499, 549, 874, 885

[56] References Cited

U.S. PATENT DOCUMENTS

| | | | |
|---|---|---|---|
| 2,980,264 | 4/1961 | Burt et al. | 318/39 X |
| 3,456,565 | 7/1969 | Flaum et al. | 83/885 X |
| 3,646,418 | 2/1972 | Sterns et al. | 318/603 |
| 4,010,677 | 3/1977 | Hirakawa et al. | 83/885 X |
| 4,224,847 | 9/1980 | Tokuno | 83/499 X |
| 4,464,614 | 8/1984 | Kurakake | 318/39 |
| 4,516,454 | 5/1985 | Mosburger | 83/499 |

*Primary Examiner*—B. Dobeck
*Attorney, Agent, or Firm*—Harding, Earley, Follmer & Frailey

[57] ABSTRACT

Tools to be positioned all at once are moved from a stand-by reach toward a positioning reach by means of a rotatable shaft, and respectively positioned at their desired positions in the positioning reach after passing an origin located at a border line between the stand-by and positioning reaches. Central computer controls count pulse signals transmitted from a pulse generator synchronously rotated by the rotatable shaft, and compensate set values for the desired positions for the distance over which each tool has been moved in the stand-by reach.

2 Claims, 2 Drawing Figures

METHOD FOR POSITIONING TOOLS

This invention relates to a method for positioning a plurality of tools or pairs of tools slidably mounted on a carrier shaft or a pair of carrier shafts along the carrier shaft or shafts onto respective desired positions.

As to conventional methods of this kind, there are known methods which are disclosed in U.S. Pat. No. 3,646,418 and Japanese Patent Publication No. 57-50667.

The U.S. patent aforesaid discloses an apparatus for positioning tools as well as the method. That apparatus is commonly used for four slitter-scorer units, and accordingly has parts necessary for this purpose. To position pairs of slitting and scoring tools for one of the four units, the apparatus is provided with shifters equal to the total number of the pairs of slitting and scoring tools of the unit, each shifter being capable of engaging and disengaging with a pair of slitting and scoring tools. The apparatus is also provided with a rotatable shaft which is a drive screw for moving the multiple shifters. Each shifter is controlled so that the shifter may or may not be moved when the drive screw is rotated, and the pairs of tools are simultaneously moved by means of the shifters along a pair of carrier shafts respectively when the tools are to be moved in the same direction, and then positioned at desired positions.

Since each shifter is provided with a pulse generator for communicating its actual location to a control system, and since the control system is provided with a plurality of reversible counters or "forward-backward" counters equal to the number of the shifters, the control system must compare the pulse signals which have been generated by the pulse generator on each shifter with pulse signals corresponding to an actual location of a pair of tools with which the shifter is to be engaged, or with pulse signals representative of a desired position of a pair of tools with which the shifter has been engaged, and comand each shifter to move or not to move in accordance with the rotation of the drive screw. Accordingly, the multiple shifters may be simultaneously moved when the shifters are to be moved in the same direction. The pulse signals memorized in the control system as the actual location of each pair of tools is the count of the pulse signals which have been generated by the pulse generator mounted on the shifter for communicating its actual location to the control system.

Each reversible counter commences to count pulse signals when respective pairs of tools pass one of border lines (or origins) between one of stand-by reaches located adjacent opposite ends of a pair of carrier shafts and a positioning reach extending over the middle portions of the pair of carrier shafts, and subtracts pulse signals transmitted from respective generators when the drive screw is rotated in the reverse direction. Accordingly, the count present in each counter corresponds to the distance between the location of the associated shifter and the origin.

A disadvantage of the method for positioning tools according to the U.S. patent aforesaid is that there are many kinds of signals because each shifter is provided with its own pulse generator, and accordingly the control system is complicated.

The Japanese Patent Publication No. 57-50667 aforesaid discloses a method for positioning tools wherein multiple tools mounted respectively on a carrier shaft are displaced along the carrier shaft in a group by means of a single shifter which is arranged on a drive screw parallel to the carrier shaft and moved in accordance with the rotation of the screw, said shifter being capable of gripping a tool located at an end of the group to push the group of tools, and detached one by one from the group when the group reaches each of desired positions along the carrier shaft.

In this method, since only a pulse generator is arranged at the drive screw, only a counter is provided in the control system, and accordingly the control system is simplified. However it is necessary for the shifter to release a tool which has reached its desired position and to grip a tool located at the end of the group of tools except for that tool which remains positioned at the desired position. Accordingly, the control system requires additional portions for this purpose, and furthermore this method takes much time to position the tools.

Japanese Patent Application Publication No. 57-168893 additionally is referred to. The Japanese patent application aforesaid discloses an apparatus for positioning tools, which apparatus has plural screws of different construction as compared with the apparatus for positioning tools according to the U.S. patent aforesaid. In the apparatus according to the Japanese patent application aforesaid, the plural screws are fixed and not rotated, but a rotatable shaft is provided and drives plural nuts threadedly engaged with the respective screws, whereby shifters are moved forward or backward along the screws.

An object of the present invention is to provide a method for positioning tools wherein a plurality of tools or pairs of tools mounted on a carrier shaft or a pair of carrier shafts are moved and positioned along said carrier shaft or shafts by means of a plurality of shifters corresponding to the number of said tools or pairs of tools, said shifters being mounted on a rotatable shaft and controlled by the control system so as to be moved or not to be moved along said rotatable shaft in accordance with the rotation of said rotatable shaft, in such a way as disclosed in the U.S. Pat. No. 3,646,418 aforesaid or the Japanese Patent Application Publication No. 57-168893 aforesaid, said method not only being controlled by a simplified control system with a single counter but also being capable of positioning the tools in a shorter time than the method according to the Japanese Patent Publication No. 57-50667 aforesaid.

The present invention consists in a method for positioning tools wherein a plurality of tools or pairs of tools mounted on a carrier shaft or a pair of carrier shafts are moved and positioned along said carrier shaft or pair of carrier shafts by means of a plurality of shifters provided correspondingly to the number of said tools or pairs of tools, said shifters being mounted on a rotatable shaft arranged parallel to said carrier shaft or pair of carrier shafts and being controlled by a control system so as each to be moved or not to be moved along said rotatable shaft, characterized by the steps of: moving all at once a desired number of tools or pairs of tools from a stand-by reach, in which the tools stand by, toward a positioning reach, in which the tools are to be positioned, on said carrier shaft or pair of carrier shafts so as each to enter the positioning reach after passing an origin located at a border line between the stand-by reach and the positioning reach; and compensating set values for the desired positions of the tools or pairs of tools for the distance over which each tool or pair of tools has been moved in the stand-by reach until that tool or pair of tools reaches the origin, said set values each being predetermined in accordance with the distance between the origin and the desired position of each tool or pair of tools.

The preferred method for positioning tools according to the present invention is illustrated in connection with the annexed drawings.

Figure 2:
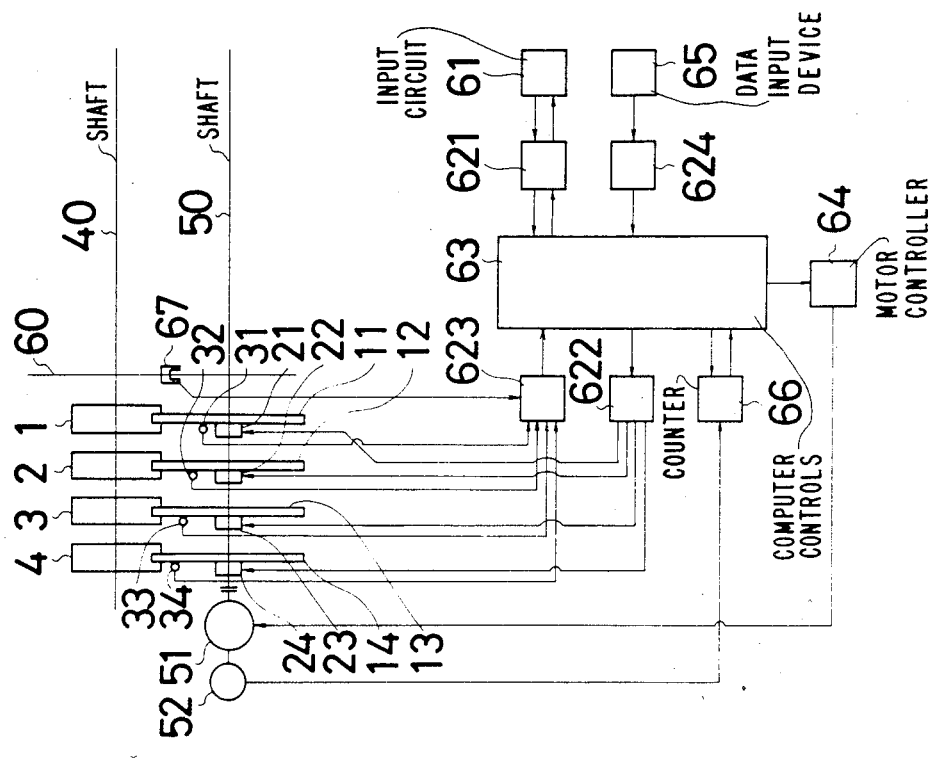
FIG. 2 is a diagram of a control system used in the operation according to the present invention.
Figure 1:
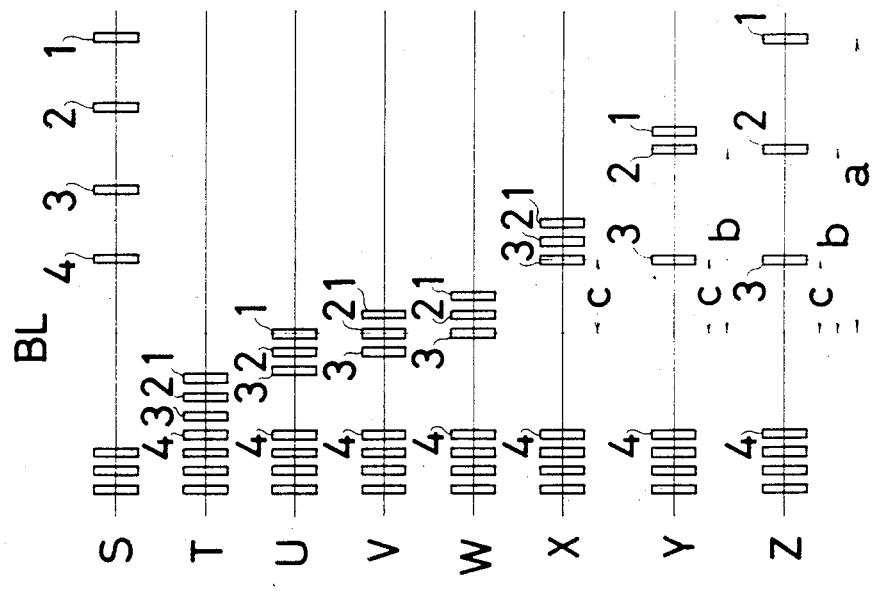
FIG. 1 is a series of diagrammatic representations illustrating the operation for positioning tools in accordance with the present invention.

In FIG. 1, one reach extending from the right side of a border line (abbreviated BL) drawn approximately at the middle is called a positioning reach, in which tools are to be positioned, and the other reach extending from the left side of the border line is called a stand-by reach, in which the tools are to stand by. An origin 60 is a standard point for positioning the tools and is located at the border line as shown in FIG. 2.

In the preferred method, four tools located in the positioning reach on a carrier shaft 40 are to be moved into the stand-by reach, in this case a motor 51 is rotated in the reverse direction of rotation. Thereafter, three of the tools located in the stand-by reach on the carrier shaft 40 are to be moved toward the positioning reach, in this case the motor 51 is rotated in the normal direction of rotation.

The operation of the foregoing method will be explained.

(1) Moving tools located in the positioning reach into the stand-by reach:

To energize clutch means 21 to 24 of shifters 11 to 14 for tools 1 to 4 and to start the motor 51 in such a way as to rotate a rotatable shaft (drive screw) 50 in the reverse direction of rotation, instructions are given to central computer controls 63 via an interface 621 from an input circuit 61. The central computer controls 63 give the clutch means 21 to 24 instructions to energize them via an interface 622, and also give the motor 51 instructions to start in the reverse direction of rotation via a motor controller 64.

Thus the motor 51 starts and the rotatable shaft 50 begins rotating. Then the shifters 11 to 14 move along the rotatable shaft 50. At the same time the tools 1 to 4 are moved along the carrier shaft 40 from their locations in the positioning reach as shown at S of FIG. 1 to their stand-by positions in the stand-by reach as shown at T of FIG. 1.

When the shifters 11 to 14 reach their stand-by positions, detectable pieces thereof (not shown) are detected by respective sensors 31 to 34 arranged correspondingly to their stand-by positions. Whenever the sensors 31 to 34 detect their associated detectable pieces, signals are sent to the central computer controls 63 via an interface 623. In response to the signals the central computer controls 63 give the respective clutch means 21 to 24 of the shifters 11 to 14 instructions to declutch. Thus the shifters 11 to 14 stop at their respective stand-by positions, even though the rotatable shaft 50 continues to turn. When all of the shifters 11 to 14 have stopped, motor controller 64 makes the motor 51 stop in accordance with instructions from the central computer controls 63.

(2) Registering set values for the desired positions of tools in the central computer controls:

Set values for the desired positions for tools 1 to 3 to be positioned in the positioning reach, that is position data (a, b, c) each corresponding to the distance between the origin 60 and a tool position, extending to the right in a direction parallel to the rotatable 50, are registered in the central computer controls 63 via an interface 624 from a data input device 65.

(3) Moving the tools all at once from the stand-by reach toward the positioning reach and making a generator produce pulse signals:

To energize the clutch means 21 to 23 of the shifters 11 to 13 and to control the motor 51 so as to rotate in the normal direction of rotation under the control of the motor controller 64, instructions are given to the central computer controls 63 via the interface 621 from the input circuit 61. Thus the motor 51 is started, and the tools 1 to 3 are moved together from their stand-by positions in the stand-by reach as shown at T of FIG. 1 toward the positioning reach. A pulse generator 52 arranged at the rotatable shaft 50 produces pulse signals synchronously with the rotation of the rotatable shaft 50, and the pulse signals are counted by a counter 66.

(4) Compensating the set values:

Whenever an origin detector 67 arranged correspondingly to the origin 60 detects detectable pieces (not shown) arranged respectively on the shifters 11 to 13, that is to say, when the tool 1 passes the border line BL as shown at U of FIG. 1, when the tool 2 passes the borderline BL as shown at V of FIG. 1, and when the tool 3 passes the border line BL as shown at W of FIG. 1, signals are transmitted to the central computer controls 63 via the interface 623 from the origin detector 67. In response to each signal transmitted from the origin detector 67 the central computer controls 63 memorize the count present in the counter 66. In the central computer controls 63, the count is added to the set value for the tool which has passed the border line BL, said count corresponding to the distance over which each tool has been moved in the stand-by reach until the tool reaches the origin 60. Thus all of the set values for the tools are compensated in turn.

(5) Comparing the count present in the counter with the compensated set values:

The counter 66 counts pulse signals produced by the generator 52, and the count present in the counter 66 always is compared with the foregoing compensated set values by the central computer controls 63.

(6) Stopping the tools:

Whenever the count present in the counter 66 coincides with one of the compensated set values, the central computer controls 63 give the motor controller 64 instructions to stop the motor 51, and also give one of the clutch means 21 to 23 of the tools 1 to 3 instructions to declutch. The declutched clutch means corresponds to the tool whose compensated set value coincides with that count. The stoppage of the motor 51 is carried out after the motor 51 has been changed so as to rotate at low speed when the count present in the counter 66 becomes a certain quantity which is slightly less than either one of the compensated set values.

The central computer controls 63 again give the motor controller 64 instructions to start the motor 51, and then the operation of (5) is commenced again. Thus the operation of (6) proceeds and the other tools are positioned in turn. At X of FIG. 1 the state is shown when the tool 3 has been positioned, at Y of FIG. 1 the state is shown when the tool 2 has been positioned and at Z of FIG. 1 the state is shown when the tool 3 has been positioned.

As a matter of course, the method for positioning tools according to the present invention may be changed so as to be carried out in such a way that the counter 66 commences to count the pulse signals transmitted from the pulse generator 52 at the time when the tool 1 has reached the origin 60, in other words, the set value for the desired position of the tool 1 never is compensated, but the set values for the tools other than the tool 1 are compensated for the distance over which each tool is moved in the stand-by reach after the tool 1 has reached the origin 60.

As described previously, the advantage of the method for positioning tools according to the present invention is that the tools are positioned in a short time under the control of the simplified control system. Besides the present invention has further advantage in that the actual stand-by locations of the tools in the stand-by reach may be permitted to be roughly controlled. For instance, if the tool 1 is located extremely apart from the tool 2 in the stand-by reach, the tool 1 may be positioned earlier than the tool 2 in the positioning reach.

What is claimed is:

1. A method for positioning tools at desired positions in a positioning reach wherein a plurality of tools mounted on a carrier shaft are moved and positioned along said carrier shaft by means of a plurality of shifters corresponding to the number of said tools, said shifters being mounted on a rotatable shaft arranged parallel to said carrier shaft and being controlled by a control system whereby each shifter may be moved selectively along said rotatable shaft, characterized by the steps of moving all at once a desired number of tools on said carrier shaft from their positions in a stand-by reach, in which the tools stand by, toward the positioning reach in which the tools are to be positioned, whereby each tool enters the positioning reach after passing an origin located at a border line between the stand-by reach and the positioning reach; predetermining set values for the desired positions for the tools in accordance with the distance between the origin and the desired position for each tool in the positioning reach; and compensating the set value for the desired position of each tool for the distance over which each tool is moved from its position in the stand-by reach until that tool reaches the origin.

2. A method for positioning tools at desired positions in a positioning reach wherein a plurality of pairs of tools mounted on a pair of carrier shafts are moved and positioned along said pair of carrier shafts by means of a plurality of shifters corresponding to the number of said pairs of tools, said shifters being mounted on a rotatable shaft arranged parallel to said pair of carrier shafts and being controlled by a control system whereby each shifter may be moved selectively along said rotatable shaft, characterized by the steps of moving all at once a desired number of pairs of tools on said pair of carrier shafts from their positions in a stand-by reach, in which the tools stand by, toward the positioning reach in which the tools are to be positioned, whereby each pair of tools enters the positioning reach after passing an origin located at a border line between the stand-by reach and the positioning reach; predetermining set values for the desired positions for the parts of tools in accordance with the distance between the origin and the desired position for each pair of tools in the positioning reach; and compensating the set value for the desired position of each pair of tools for the distance over which each pair of tools is moved from its position in the stand-by reach until that pair of tools reaches the origin.

* * * * *

UNITED STATES PATENT OFFICE
CERTIFICATE OF CORRECTION

PATENT NO. : 4,580,086
DATED : April 1, 1986
INVENTOR(S) : Masateru Tokuno et al.

It is certified that error appears in the above-identified patent and that said Letters Patent are hereby corrected as shown below:

Column 4, line 3, after "rotatable" insert --shaft--

Column 6, line 28, change "parts" to --pairs--

Signed and Sealed this

First Day of July 1986

[SEAL]

Attest:

DONALD J. QUIGG

Attesting Officer

Commissioner of Patents and Trademarks